April 2, 1957     G. K. ANGEVINE     2,787,157
TESTING DEVICE FOR LAMINATED OR COATED SPECIMENS
Filed June 17, 1954
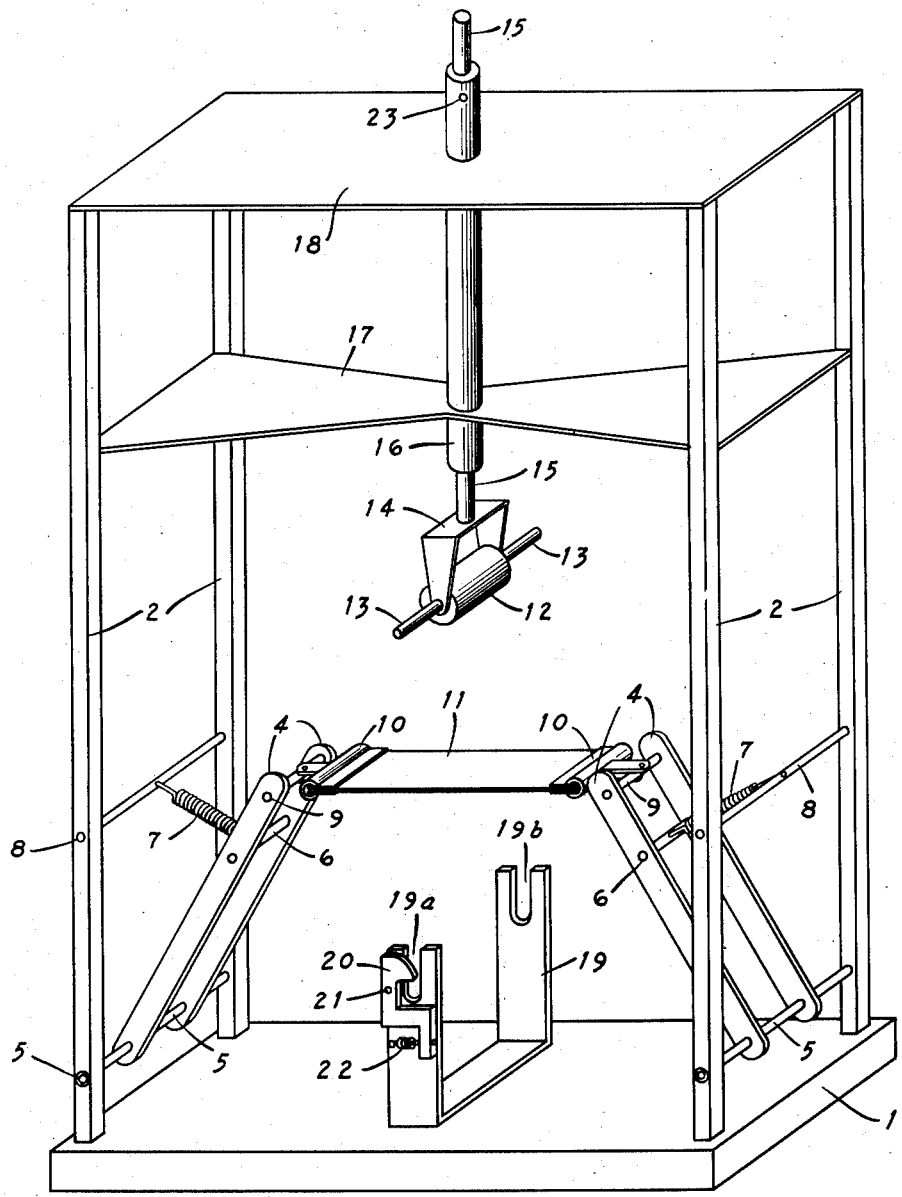
ATTEST:
*Fred C. Philpitt.*
INVENTOR.
Gordon K. Angevine
BY *Norbert E. Bisch*
ATTORNEY

2,787,157

TESTING DEVICE FOR LAMINATED OR COATED SPECIMENS

Gordon K. Angevine, Drexel Hill, Pa., assignor to The Atlantic Refining Company, Philadelphia, Pa., a corporation of Pennsylvania Application June 17, 1954, Serial No. 437,312

2 Claims. (Cl. 73—12)

This invention relates to an apparatus for testing specimens which have been laminated or coated with a chemical composition. In one particular embodiment, this invention pertains to an apparatus for testing paper or cardboard specimens which have been coated with a composition containing petroleum wax.

Within the last decade there has been a great increase in the use of petroleum wax compositions for coating purposes. For example, the use of wax coated cardboard milk cartons has largely replaced the glass milk bottles which were almost universally employed a number of years ago. The petroleum industry has constantly sought to further increase the market for wax coating compositions by conducting extensive research programs. These research efforts have been primarily directed along the lines of improving the inherent coating properties of wax by blending other chemicals with the wax. In connection with these research efforts, it is important to the researchers that they have a testing device available to them for testing the properties of various wax formulations and which can be relied upon to give a fairly accurate indication as to the actual service performance of these formulations.

This invention relates to such a device and will be particularly described with reference to the testing of wax formulations to be used in the coating of paperboard milk containers, although it should be understood that the invention is not limited thereto. Paperboard milk containers coated with wax generally fail when the continuous wax film is cracked or flaked and the milk is able to soak through the paperboard. This failure is usually either attributed to the bouncing and bumping which the filled container receives during handling operations or to the stress concentrations set up in the wax film during the cardboard coating operation. No suitable laboratory test has previously been devised for simulating the conditions which exist when a waxed milk carton is subjected to the above treatment.

It is therefore a general object of this invention to provide an apparatus for testing coated or laminated specimens.

It is a further object of this invention to provide an apparatus for testing the flexibility and impact loading receptibility of laminated specimens or specimens which are coated with a chemical composition.

It is a specific object of this invention to provide an apparatus for testing the flexibility and impact loading receptibility of paperboard specimens which contain a coating of a wax composition.

With these and other objects in view, the invention consists of an apparatus which tests the ability of a wax coated specimen to withstand both flexure and impact under controlled conditions.

A clearer conception of the invention may be obtained by referring to the attached drawing.

The base 1 has four posts 2 extending upwardly therefrom, and these posts serve the function of supporting the other members of my novel testing device. Near the bottom of posts 2 are pivot bars 5 and located on pivot bars 5 are support arms 4. Support arms 4 in addition to being spaced apart over a portion of pivot bar 5 are separated by rigid member 6. Member 6 in turn is operatively connected by tension means 7 to structural member 8 which is located between posts 2. Tension means 7 may be made adjustable if desired. Members 6 and 8 and tension means 7 acting in conjunction, serve to limit the arc through which support arms 4 can move. In the embodiment shown in the drawing, support arms 4 may move through an arc between a nearly upright position and a practically horizontal position depending upon the force applied downwardly upon the arms and the strength of tension means 7. Member 9 is located at the uppermost end of support arms 4 and serves not only to space the support arms a fixed distance apart but also serves as a means by which clamps 10 may be attached. Clamps 10, as shown in the drawing, are of the spring clamp type frequently encountered in an office but it is to be understood that any other suitable type of clamps or clamping means may be used. The outer ends of clamps 10 may be welded to member 9, in which event member 9 is constructed so as to be freely rotatable between support arms 4, or clamp 10 may be attached to member 9 by a wire or a chain means which will slip freely and loosely around member 9. Clamps 10 are adapted to hold test specimen 11 in a substantially horizontal plane. Located directly above test specimen 11 is a dowel 12 which is supported on dowel support bar 13. Dowel 12 preferably has a cylindrical shape, as shown in the drawing and may be of any desired size. Dowel support bar 13 is in turn suspended from yoke 14 and yoke 14 is fixed to the bottom of rod 15. Dowel 12 and dowel support bar 13 may be either rigidly attached to yoke 14 or may be adapted to freely rotate therein. Rod 15 passes upwardly through guide shaft 16 which is rigidly fixed between plates 17 and 18. A drilled hole 23 passes through guide shaft 16 and rod 15. When a pin or bolt is inserted in hole 23, rod 15 is prevented from falling or sliding downwardly within guide shaft 16, and dowel 12 is thereby positioned in the proper location at a fixed distance above test specimen 11. Below test specimen 11 there is located a dowel limiting member 19 which contains the two vertical slots 19a and 19b. Slots 19a and 19b are located directly below the outer extremities of dowel support bar 13. The distance between slots 19a and 19b exceeds the length of dowel 12, but is less than the distance between the ends of dowel support bar 13. Clutch means 20 is attached to one side of dowel limiting member 19 by a pin 21 so that, from a side view, the downwardly curved upper portion of clutch means 20 appears to cover a part of vertical slot 19a. Pin 21 is attached to clutch means 20 and the side of dowel limiting member 19 in such a manner that the clutch means 20 may rotate about the axis of pin 21. Tension means 22, which connects the bottom portion of clutch means 20 with the side of dowel limiting member 19 holds or biases clutch means 20 in the position shown until the upper portion of clutch means 20 is moved to the left by the downward movement of dowel support bar 13, as will be described more fully hereinafter.

My testing apparatus is operated in the following manner. Clamps 10 are loosened and test specimen 11 inserted therein. The clamps 10 are tightened around each end of test specimen 11 and the pin or bolt passing through hole 23 is removed. As the pin or bolt passing through hole 23 is removed, rod 15 and dowel 12 will drop downwardly toward test specimen 11. As the freely falling dowel 12 contacts the upper surface of test specimen 11, the downward force of this dowel will cause the test specimen to be pushed downwardly toward base 1. As the test specimen 11 is forced downwardly, clamps 10 and support arms 4 are also forced downwardly and to some extent inwardly. The dowel 12 will continue to fall downwardly until dowel support bar 13 falls into the slots 19a and 19b on each side of dowel limiting member 19. As the dowel support bar 13 contacts the downwardly curved upper portion of clutch means 20, the upper portion of clutch means 20 is forced to the left thereby allowing dowel support bar 13 to reach the bottom of the slots 19a and 19b. As soon as the dowel support bar touches the bottom of these slots the tension means 22 pulls the upper portion of clutch means 20 back to its original position, thus holding the dowel support bar at the bottom of the slot 19a and 19b and thereby preventing dowel support bar 13 and dowel 12 from rising upwardly by virtue of the pull exerted by tension means 7. When the dowel support bar 13 is held at the bottom of slots 19a and 19b, the test specimen 11 conforms to the curvature of the lower portion of dowel 12 so that the test specimen 11 is thereby rendered somewhat U shaped. It should be pointed out here that clutch means 20 may be omitted from my apparatus but it is preferable not to do so since its elimination will usually result in a series of uncontrolled bounces by the dowel upon the test specimen 11 which tends to decrease both the accuracy and reproducibility of the test method. Other clutch means can, of course, be employed.

After the dowel support bar has come to rest in the bottom of slots 19a and 19b, the testing procedure is complete and the test specimen 11 may be removed for inspection. Removal of the test specimen is easily accomplished by manually releasing clutch means 20, lifting down 20 to its original position, inserting a pin or bolt in hole 23, and releasing clamps 10.

When the test specimen is removed it is examined for any cracks which may have developed in the wax coating due to flexure and impact loading. In some cases, it has been observed that flakes of the waxing coating formulation will be completely separated from the paperboard base, while with other wax formulations very few, if any, cracks appear on the coated paperboard. Results will, of course, vary, depending upon the height of the dowel above the specimen, the weight of the dowel, etc. A unique characteristic of my machine is that the specimen may be uniformly tested over a large rectangular test area rather than a knife edge form of test area usually associated with impact testing.

It has been found that the use of the above testing apparatus enables one to not only compare the relative merits of wax formulations but also to obtain a fairly accurate indication as to how particular wax formulations will stand up under actual service performance conditions. Although this invention has been particularly described in relation to the testing of wax formulations on paperboard, it will be understood that the apparatus could also be applied to the testing of other coating materials such as asphalt and laminated materials and the service performance of materials such as linoleum, rubber and flexible paint films. The tests may be conducted under low or high temperature conditions depending upon the nature of the material being tested.

While the illustrated example constitutes a practical embodiment of my invention, I do not wish to limit myself precisely to these details, since manifestly the same can be considerably varied without departing from the spirit of my invention as defined in the appended claims.

I claim:

1. An apparatus for testing coated specimens which comprises clamping and tension means adapted to hold the coated specimen in a substantially horizontal position; an impact means positioned above said specimen, said impact means comprising a vertically guided rod and a contacting member, said contacting member located adjacent the bottom of the vertically guided rod and having an essentially cylindrical surface whose axis lies in a horizontal plane and is transverse to the coated specimen, said contacting member elongated to an extent to contact substantially the entire width of the coated specimen and means for causing said impact means to fall upon said coated specimen.

2. An apparatus according to claim 1, wherein there is positioned below the test specimen a vertically slotted limiting member having a clutch means pivotally attached to one side of the limiting member to provide an axis of rotation for the clutch means, said clutch means comprising an upper portion covering a part of a vertical slot in the limiting member, said upper portion being downwardly curved, a lower portion below the axis of rotation being attached to the side of the limiting member by tension means, said limiting member and clutch means adapted to substantially restrain further vertical movement of the impact means shortly after the impact means has fallen upon the test specimen.

References Cited in the file of this patent
UNITED STATES PATENTS

| | | |
|---|---|---|
| 720,575 | Fremont | Feb. 17, 1903 |
| 1,901,460 | Lewis | Mar. 14, 1933 |
| 2,264,412 | Shindel | Dec. 2, 1941 |
| 2,469,013 | Sobota | May 13, 1949 |
| 2,518,350 | McCormick | Aug. 8, 1950 |